(12) United States Patent
Karch

(10) Patent No.: US 9,251,196 B2
(45) Date of Patent: *Feb. 2, 2016

(54) MONITORING AND AUDITING SYSTEM

(75) Inventor: Robert Karch, Greenwich, CT (US)

(73) Assignee: Teleran Technologies Inc., Fairfield, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/022,699

(22) Filed: Feb. 8, 2011

(65) Prior Publication Data

US 2011/0276587 A1    Nov. 10, 2011

Related U.S. Application Data

(63) Continuation of application No. 10/919,643, filed on Aug. 17, 2004, now Pat. No. 7,885,934.

(51) Int. Cl.
*G06F 17/30* (2006.01)
(52) U.S. Cl.
CPC .................. *G06F 17/30368* (2013.01)
(58) Field of Classification Search
CPC .................. G06F 17/30368
USPC .................. 707/648
See application file for complete search history.

(56) References Cited

U.S. PATENT DOCUMENTS

| | | | | |
|---|---|---|---|---|
| 5,561,795 A * | 10/1996 | Sarkar | ............... | G06F 11/1471 |
| 7,051,046 B2 * | 5/2006 | Virag | ............... | G06Q 10/10 |
| 7,885,934 B2 * | 2/2011 | Karch | ............... | G06F 17/30368 |
| | | | | 707/609 |
| 2003/0028544 A1 * | 2/2003 | Virag | ............... | G06Q 10/10 |
| 2004/0267703 A1 * | 12/2004 | McEnery et al. | ............... | 707/3 |
| 2006/0041547 A1 * | 2/2006 | Karch | ............... | G06F 17/30368 |
| 2011/0276587 A1 * | 11/2011 | Karch | ............... | G06F 17/30368 |
| | | | | 707/769 |

* cited by examiner

*Primary Examiner* — Sheree Brown
(74) *Attorney, Agent, or Firm* — Kaplan Breyer Schwarz & Ottesen, LLP

(57) ABSTRACT

An improved method and apparatus for auditing database queries, wherein comments are added by a server prior to the server forwarding the queries to the database system. The comments are then used to derive audit information, which is correlated with other audit information in a different server, to produce a more complete audit record.

13 Claims, 2 Drawing Sheets

MONITORING AND AUDITING SYSTEM

This application is a Continuation of application Ser. No. 10/919,643, filed Aug. 17, 2004, entitled "MONITORING AND AUDITING SYSTEM", the disclosure of which is hereby incorporated herein by reference in its entirety.

TECHNICAL FIELD

This invention relates to business intelligence (BI) system monitoring tools, and more specifically, to an improved tool for monitoring BI data base queries and related transactions, and for producing a more complete audit trail, then was possible in prior systems.

BACKGROUND OF THE INVENTION

Business intelligence monitoring tools are typically utilized in connection with large data base access systems in relatively large corporations, as well as in other environments. Typically, such tools monitor and/or control access to databases to increase efficiency, implement security policies, and perform a variety of other functions. As various BI reports are run, information accessed and utilized by a relatively large number of users is often monitored and controlled.

Many business intelligence systems run on a web server, and permit plural users utilizing, for example, a thin client such as a web browser, to access the database. An exemplary such prior art arrangement is shown in FIG. 1. Plural clients 102-104 connect to the database system 106 through a server with a BI system, shown as 101.

Many organizations provide monitoring capability shown as 105, in order to monitor the reports and queries taking place between the data base system 106 and the clients through server 101.

One problem with such prior art arrangement is that it is customary for the server with BI tool 101 to utilize a single database login to process the various requests for reports, queries, and other transactions being communicated between the users 102-104 and the database system 106. More specifically, database 106 and server 101 interface as if server 101 were a single user of the database system invoking various transactions. The server 101 includes appropriate software to then separate out responses from database 106 and forward them to the appropriate one of users 102-104.

Consequently, queries and other transactions arriving at server 101 from users 102-104 are often stripped of user IDs and other relevant information, and subsequently are sent to database system 106. Accordingly, the communications between database 106 and server 101 includes little or no indication of the specific user 102-104 for which those communications are relevant, and may also be lacking other important information.

Because the internal information within the server 101 is often unavailable to the monitor 105, and is almost always unavailable in real time, an organization monitoring the communications between 106 and server 101 cannot produce an audit trail that is capable of identifying specific users and other specific information that the server 101 has stripped off.

In view of the foregoing, prior art systems are only capable of generating somewhat incomplete audit and monitoring data, and a need exists for a more accurate way for organizations to monitor and control database query and access. Additionally, since tools that restrict certain queries based upon database models may rely upon past experience with particular queries, it is important that any monitored information be available for use in updating rules and other systems that may provide security or other access restrictions.

SUMMARY OF THE INVENTION

The above and other problems of the prior art are overcome in accordance with the present invention, which creates a system that provides a more thorough and flexible technique of generating an audit trail. Monitored information between the web server and the database is supplemented offline by combining it with additional audit information maintained in an internal log by the BI server. The internal log is preferably accessed after the transactions in issue, preferably off line, to ascertain further information about the transactions, including the queries, reports, and other information. Information in the BI web server's internal event log is correlated with information monitored from the communications between the database and the web server, so that a full audit record may be constructed.

In another embodiment, software "comments" are added by the web server to one or more queries before those queries are passed from the server to the database system. The monitoring tool may be programmed in advance to understand and log the meaning of particular comments, thereby ascertaining information about the query that would otherwise be unavailable.

DETAILED DESCRIPTION OF THE PREFERRED EMBODIMENT

Figure 1:
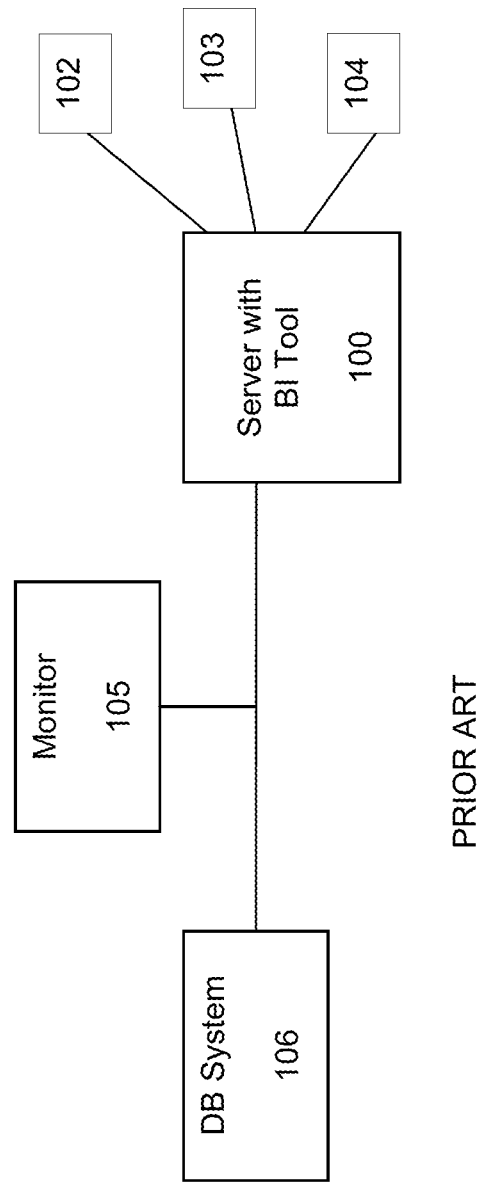
FIG. 1 shows the basic elements of the prior art business information monitoring tool for database access.
Figure 2:
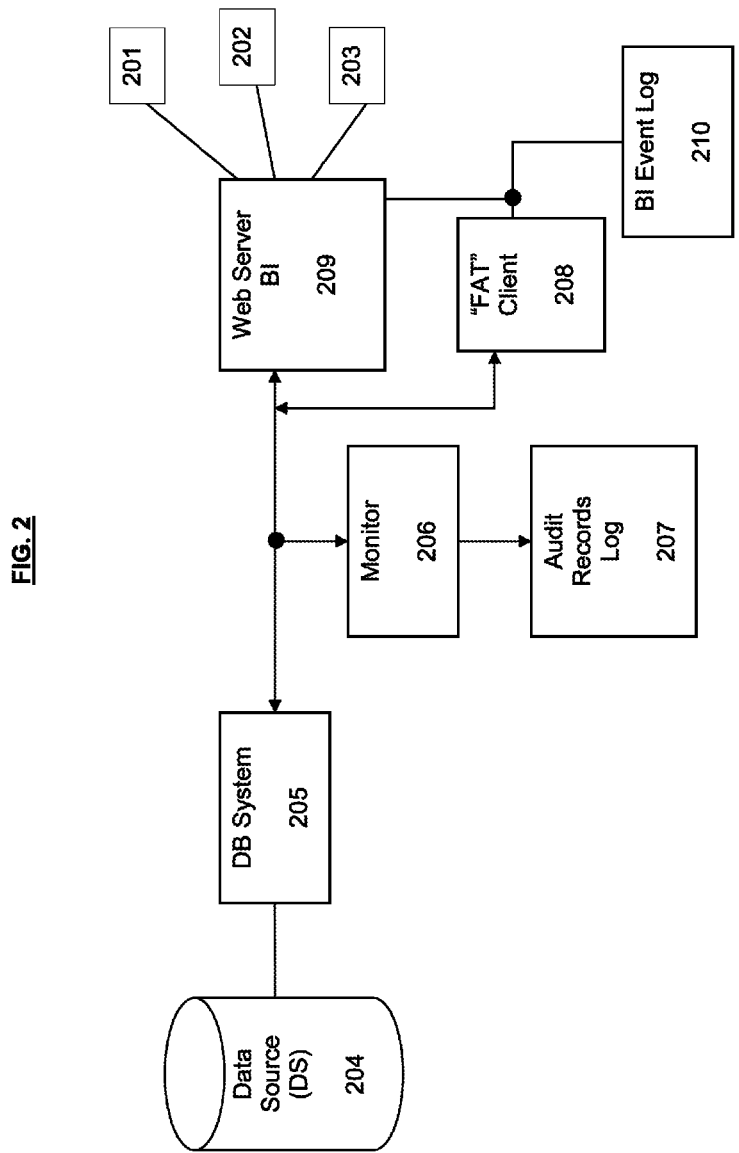
FIG. 2 shows a block diagram demonstrating conceptually the principals of the present invention.

The arrangement of FIG. 2 shows the database system 205 with a data source 204, which may be accessed by a plurality of users 201-203, intended in this example to be "thin clients", and 208 which is a "fat client". Clients 201-203, in the exemplary embodiment shown, access database system 205 through a web server 209, which implements various features of a business intelligence system. A "fat client" such as 208, which may be a PC or other computer, may also access database system 205 directly, without interfacing through a web server. Those of ordinary skill in the art understand the difference between a thin client and a fat client, the former having less storage and other processing capability than the latter.

Although the business intelligence system implemented on web server 209 may be implemented on fat client 208, this is not necessary for the present invention, and either fat client 208 or web server 209 may implement any subset of features of the business intelligence system. A monitor 206 keeps track of information exchanged between data base system 205 and web server 209, and picks off information relevant to construct audit records in an audit log 207.

The BI event log 210 represents the "internal" event log of the web server or fat client. Although this BI event log 210 is not necessarily physically located within web server 209 or fat client 208, the BI event log is preferably generated by a web server 209 or fat client 208, as opposed to by an independent monitoring or similar tool such as 206.

Discussing first the example of thin clients 201 through 203, web server 209 accepts various queries and requests for reports, and utilizes a single database login to connect these clients to the database or may consolidate these independent transactions into a single data stream. Database system 205 often has no information concerning the individual user ids or transactions or queries of users 201-203, but instead, treats web server 209 as a single user. It is left up to web server 209, and the BI tool and/or other software therein, to separate out the various queries and other information to and from each of the individual thin clients 201-203.

In accordance with the invention, the business intelligence tool in web server 209 adds a "comment" to the various database queries transmitted from web server 209 to database system 205. This information added as a comment does not affect the operation of the database system and is ignored by database system 205. Such comments are typically used in software system so that a human reviewing the software can more easily ascertain the purpose of particular software instructions.

However, in the present invention, the comment added is preferably information that monitor 206 is set up to intercept and monitor. One possibility may be to add a user ID as a comment, so that the data stream between web server 209 and database 205 can be utilized to ascertain the particular user 201-203 that represents the source of the query. Otherwise, such information would be unavailable. Any information desirable may be added as a comment and similarly used, provided that the monitor system knows the intended meaning of the comment, and that the information required to generate the comment is available to the server or fat client to append.

Monitor 206 may then pick off this information and maintain audit records that include the particular queries, as well as the time they were issued and any other information ascertainable from the communications between web server 209 and database system 205.

The BI event log 210 is an event log maintained by the web server 209 business intelligence tool, or alternatively, by a business intelligence tool running on a fat client 208. The audit records log may then be generated by examining information monitored by monitor 206, as well as information gathered off line, at a later time during a modeling and analysis process 212, concerning the transaction that's stored in event log 210.

One example of the combination of information monitored from monitor 206 being combined to create an audit record with information in event log 210 relates to the name of the particular report being run. The web server 209 translates the request for a particular report into a series of software query language (SQL) commands, typical in such database systems. The monitor 206 detects the particular SQL commands being executed and stores them in the Audit Records Log 207. Many BI systems maintain information about reports in a repository 211. Information kept in this repository 211 includes the SQL statement or statements that will be generated by the report.

The modeling and analysis process 212 will pre-model this report information and store it in its knowledgebase 207. When the SQL is subsequently logged by the monitor 206 into the Audit Records Log 207, the modeling and analysis process 212 will match the pre-modeled SQL to the monitored SQL and thus can obtain knowledge of what particular report those commands correspond to. Hence, the audit records log 207 can contain a record that a particular report was run at a particular time, because the sequence of SQL commands intercepted by monitor 206 commonly corresponds to a single particular report.

However, in instances where plural reports generate the same SQL sequence, it is difficult for monitor 206 to ascertain which particular report is being run. This problem may be solved by supplementing the information gained by monitor 206 and the modeling process 212 with information stored by the BI event log 210. Wherein the event log 210 may be read off line and correlated with the information in audit records log 207 by the analysis process 212.

More specifically, BI event log 210 may contain the name of a particular report requested by any one of users 201-203 at a particular time. By comparing the report name and time of execution to the SQL commands captured just after that time by monitor 206 and stored in the audit records log 207, the system can ascertain which particular report was in fact run. Put another way, if the SQL commands captured at a particular time indicate that either report 1 or report 2 were run, and the BI event log 210 indicates that immediately prior to the time those SQL commands were generated, report No. 2 was run, and that report No. 1 was not run at any time close to the time the SQL commands in issue were captured by monitor 206, then report No. 2 must be the one to which the SQL captured by monitor 206 corresponds.

In a typical exemplary embodiment, three parameters that are included in the audit are the universe/catalog name that a particular report or query accesses, the report name, and the User ID. One or more parameters may be added as a comment by server 209, and one or more of the parameters may be obtained from the BI event log database. The universe/catalogue name point to a set of metadata which describes a set of tables and/or other data that may be derived from such tables and which is relevant to one or more specific reports or database queries.

There is also a need to correlate the information gathered at monitor 206 with the information relating to that same transaction stored in BI event log 206. This correlation may be done by time of day for example, where the time stamp in audit records log 207 will typically be slightly after the timestamp in BI event log 210, allowing for processing and propagation time through web server 209. Allowances must be made when the BI event log 210 and the Audit Records Log 207 are generated from different physical servers. The clocks on the individual servers may not be synchronized. The modeling and analysis process 212 must utilize a time difference adjustment when matching the timestamps.

Additionally, various combinations of checksums and serial numbers may be associated with each transaction, in order to correlate the SQL from the BI repository 211 with the data from Audit Records Log 207.

While the foregoing describes the preferred embodiments of the invention, various other modifications and additions will be apparent to those of skill in the art. The foregoing is intended to be exemplary only, and the invention is defined only by the claims appended hereto.

What is claimed is:

1. A method of logging audit information related to database access, said method comprising:
   utilizing a first server to accept database queries transmitted from plural users to said first server, and logging first audit information in a first server log, the first audit information including first sets of parameters for respective reports logged in said first server log;
   transmitting said queries from said first server to a database system after logging said first audit information;
   monitoring a communications channel between said first server and said database system;
   when said query is detected on the communications channel during the monitoring step, capturing second audit information into a second server log from the communications channel, wherein said second audit information includes second sets of parameters for respective reports stored in said second server log;

correlating the first audit information with the second audit information using a parameter in common among the first and second sets of parameters, wherein said correlating step includes matching a time of transaction recorded in said first server log with a time of transaction recorded in said second server log;

identifying a particular one of the reports having said parameter in common among the first and second sets of parameters; and combining data from said first audit information and said second audit information obtained for said identified particular report to generate a full audit record for said particular report.

2. The method of claim 1 wherein said second audit information includes at least some information that is added to said queries after said queries are transmitted from said plural users to said first server but prior to transmitting said queries from said first server to said database system.

3. The method of claim 2 wherein said first audit information includes at least one of report name, universe/catalog name, and user id of a user initiating at least one of said queries through said first server.

4. The method of claim 3 wherein the user initiating said at least one of said queries does so through a thin client in communication with said first server.

5. The method of claim 2 wherein said audit information is added as a comment.

6. A system for logging information related to database queries, said system comprising:
a first server that accepts database queries from plural users,
a second server that monitors communications between said first server and a database system, said second server recording a first log from information embedded as comments by said first server in messages transmitted from said first server to the database system, and
a third server that combines information in said first log with information placed in a second log by said first server, in order to construct a third log of desired information relevant to said queries, wherein said third log updates rules governing acceptable queries for querying said database.

7. The system of claim 6 wherein said information placed in the second log by said first server includes a user ID to identify a user that initiated a database transaction.

8. A method of implementing database access comprising:
consolidating, at a first server, queries from plural users to be sent to a database,
extracting, at the first server, information from said plural queries and logging first audit information in a first log,
adding, at the first server, comments to said queries and sending said queries to the database,
compiling, at a second server, second audit information into a second log by monitoring communications to said database and reading said comments,
correlating the first audit information with the second audit information using a parameter in common, wherein said correlating step includes matching a time of transaction recorded in the first log with a time of transaction recorded in the second log, and
combining said extracted information with said compiled information to form a third log, said step of combining utilizing identifiers added to said extracted information and said compiled information.

9. The method of claim 8 wherein said database is accessed via a Software Query Language (SQL) query.

10. A method comprising:
receiving, at a first server, queries transmitted from plural users,
logging, at the first server, first audit information into a first server log, wherein the first audit information comprises first sets of parameters for respective reports logged in the first server log,
transmitting, by the first server, the queries from the first server to a database system after logging the first audit information,
capturing, at a second server, second audit information into a second server log obtained from a communications channel between the first server and the database system, wherein the second audit information comprises second sets of parameters for respective reports stored in the second server log,
correlating the first audit information with the second audit information using a parameter in common among the first and second sets of parameters, wherein said correlating step includes matching a time of transaction recorded in said first server log with a time of transaction recorded in said second server log,
identifying a particular one of the reports having the parameter in common among the first and second sets of parameters, and
combining data from the first audit information and the second audit information obtained for the identified particular report to generate a full audit record for the particular report.

11. The method of claim 10 wherein said first audit information is user identities.

12. A system comprising:
a first server for receiving queries from plural users, wherein the first server logs first audit information in a first log, and wherein the first audit information comprises a first set of parameters for respective reports logged in the first log,
a database system for storing a database, and
a monitoring system for auditing the queries transmitted between said first server and the database system, wherein the monitoring system is arranged to capture second audit information into a second log obtained from a communications channel between the first server and the database system, and wherein the second audit information comprises a second set of parameters for respective reports stored in the second log,
the first server being configured to correlate the first audit information with the second audit information using a parameter in common among the first and second sets of parameters in order to ascertain a particular one of the reports having the parameter in common among the first and second sets of parameters, wherein said correlating step includes matching a time of transaction recorded in said first log with a time of transaction recorded in said second log.

13. The system of claim 12 wherein said queries are SQL queries.

* * * * *